Inventor:
George E. Dath.
By Henry Fuchs
Atty.

Patented July 15, 1952

2,603,101

UNITED STATES PATENT OFFICE 2,603,101

HAND BRAKE FOR RAILWAY CARS

George E. Dath, Mokena, Ill., assignor to W. H. Miner, Inc., Chicago, Ill., a corporation of Delaware Application July 21, 1950, Serial No. 175,261

7 Claims. (Cl. 74—507)

This invention relates to improvements in hand brakes of the worm gear driven type, especially adapted for use on railway cars.

One object of the invention is to provide a hand brake mechanism comprising a chain winding drum, a worm driven gear element, a clutch member operatively connecting the drum to the gear element, and lever means for shifting the clutch member, wherein means is provided for positively holding the drum against rotation in chain unwinding direction while the clutch member is being shifted to disengaged position, thereby relieving the pressure on the clutch parts to facilitate easy disengagement of the clutch member.

A further object of the invention is to provide a mechanism as set forth in the preceding paragraph, wherein the means for positively holding the drum against rotation in chain unwinding direction comprises a releasable locking pawl cooperating with a ratchet on the drum, and wherein release of the pawl is effected by the clutch shifting lever subsequent to disengagement of the clutch member, thereby permitting free unwinding of the chain winding drum.

Other objects of the invention will more clearly appear from the description and claims hereinafter following.

Figure 1:
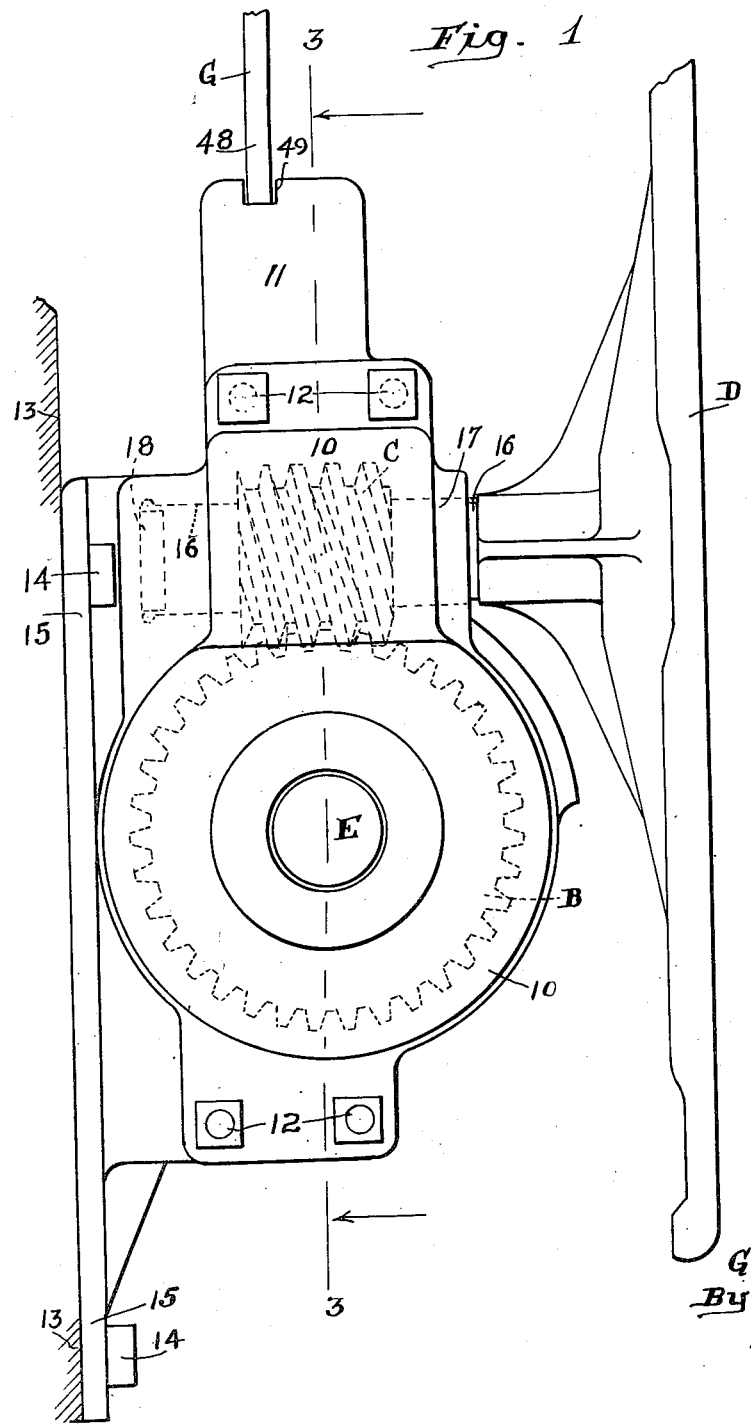
Figure 2:
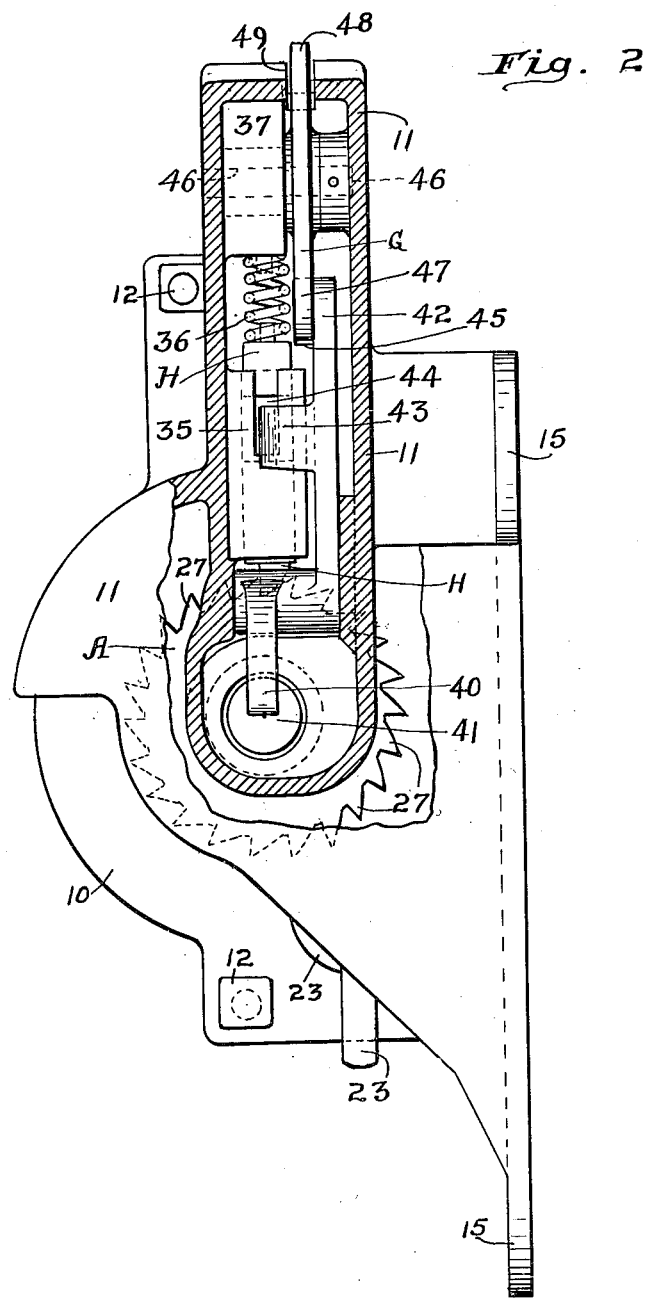
Figure 3:
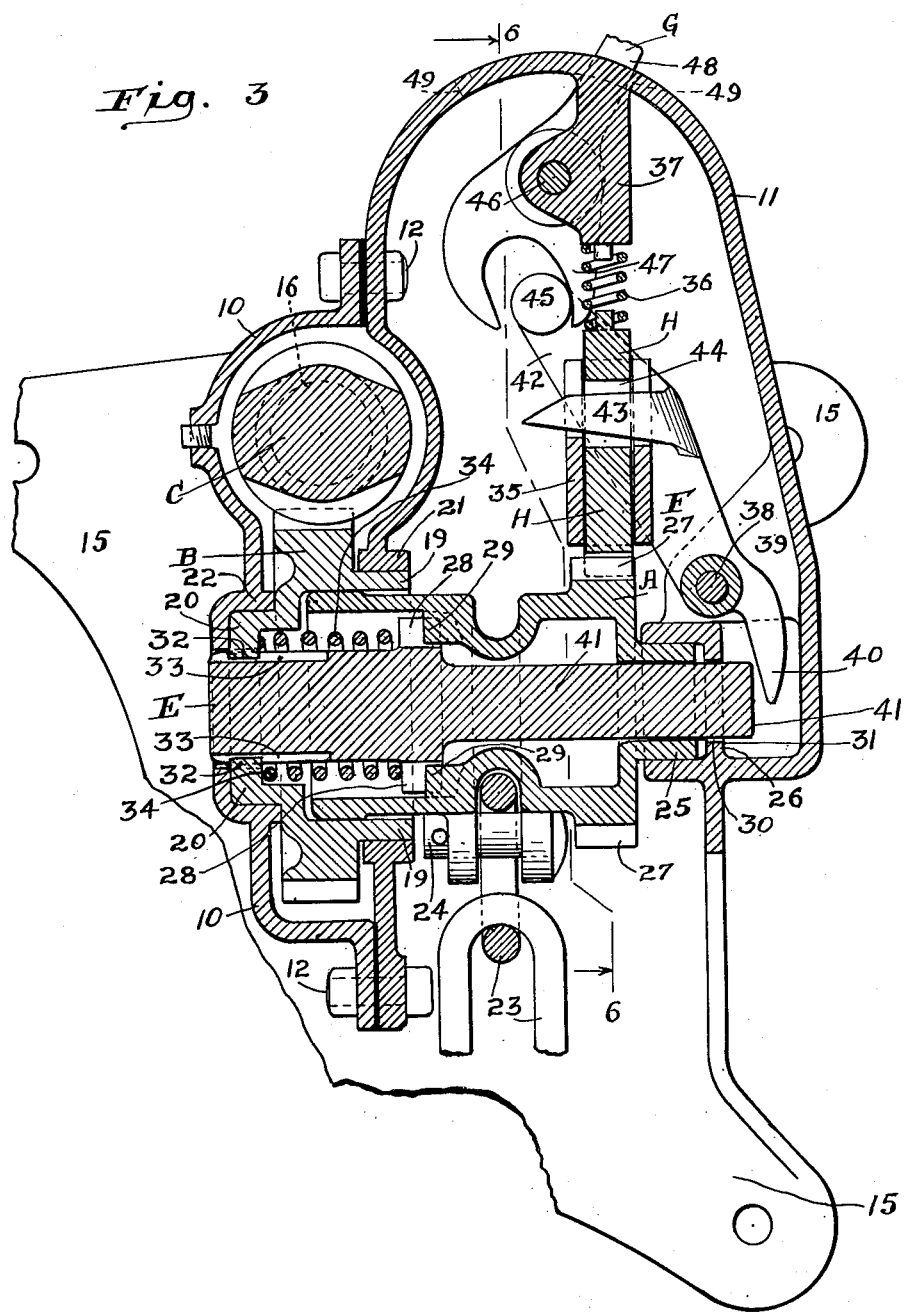
Figure 4:
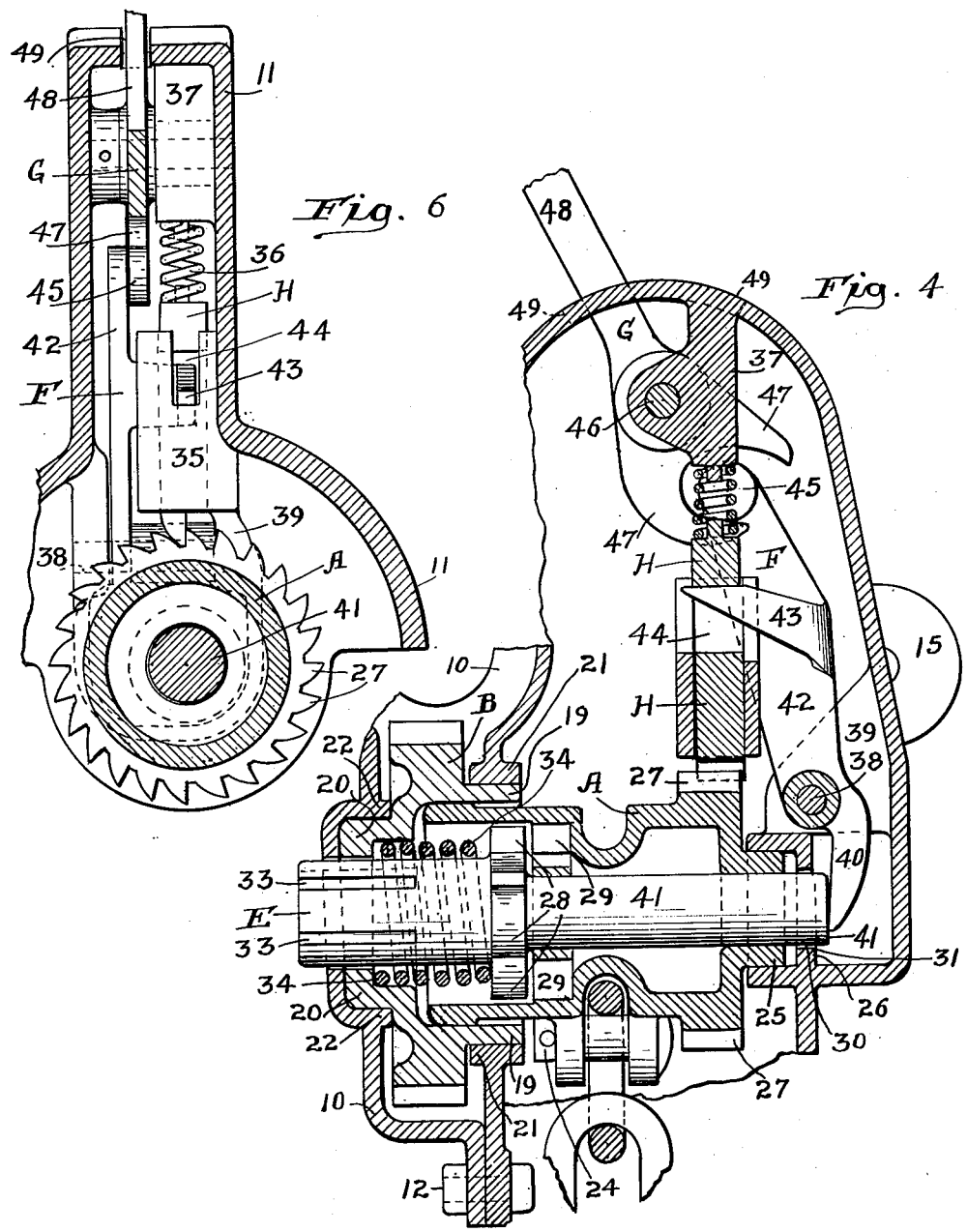
Figure 5:
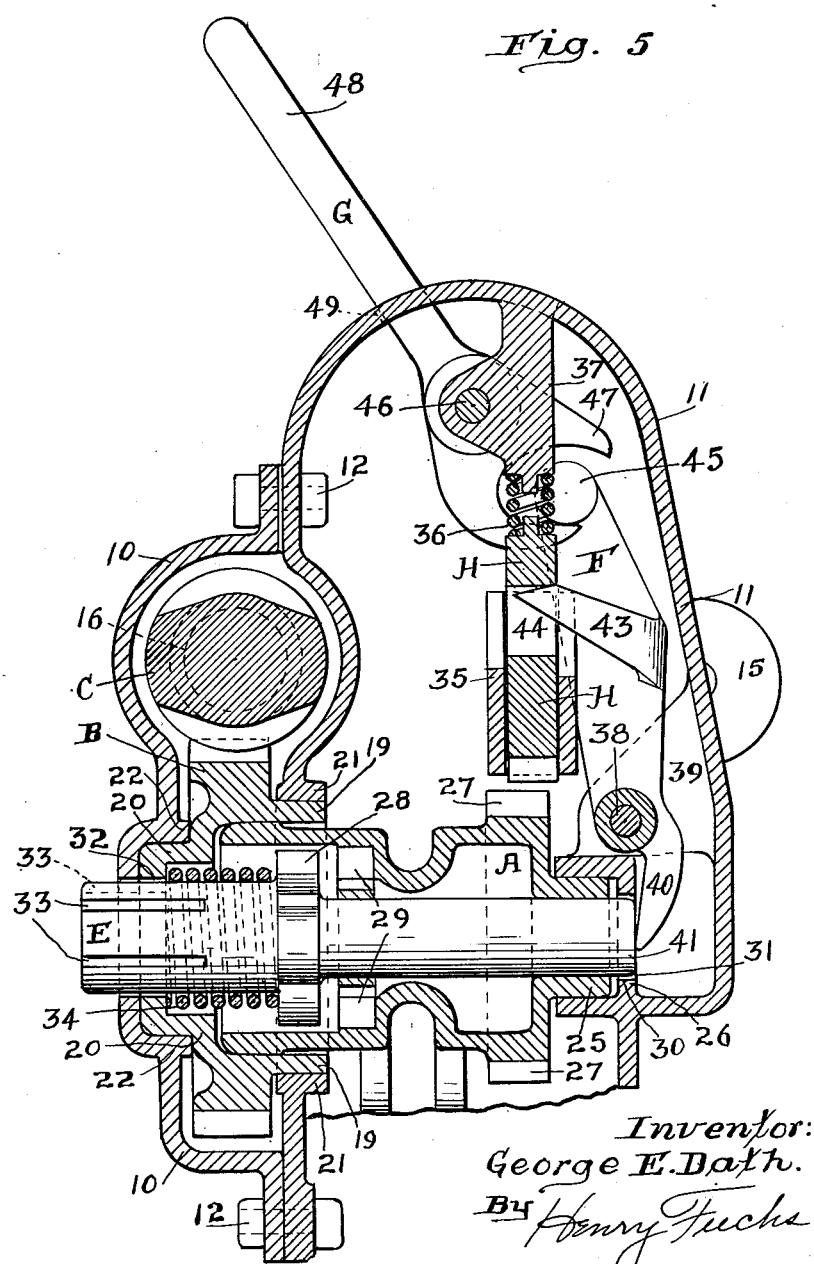

In the accompanying drawings forming a part of this specification, Figure 1 is a side elevational view of my improved hand brake mechanism, illustrating the same applied to the vertical end wall of a railway car. Figure 2 is an elevational view of Figure 1 of the rear side of the mechanism, as shown in Figure 1, said view showing the housing partly broken away to disclose certain parts of the brake mechanism, the hand wheel, worm and worm gear and housing portion for the worm being omitted in this view. Figure 3 is a vertical sectional view, corresponding substantially to the line 3—3 of Figure 1. Figure 4 is a view similar to Figure 3, partly broken away, showing the clutch member in disengaged position. Figure 5 is a view similar to Figure 3, partly broken away, showing both the clutch member and the pawl in disengaged positions. Figure 6 is a vertical sectional view, corresponding substantially to the offset line 6—6 of Figure 3.

My improved hand brake mechanism, as illustrated in the drawings, comprises broadly a chain winding drum A, a worm wheel B, a worm C, an operating hand wheel D, a clutch member E, a clutch shifting lever F, a hand lever G for actuating the clutch shifting lever F, and sliding pawl H for locking the drum A against rotation in chain unwinding direction.

The operating parts of my improved hand brake mechanism are mounted within a two part housing, comprising sections 10 and 11 secured together by bolts 12—12. The housing comprising the sections 10 and 11, as illustrated in Figure 1, is mounted on the end wall 13 of a railway car, being fixed to said wall by bolts 14—14 or similar securing elements extending through flanges 15—15 on the housing.

As shown in Figure 1, the worm C is formed on a shaft 16 having the hand wheel D fixed to the outer end thereof, and meshes with the worm wheel B. The shaft 16 is journaled in suitable bearings 17 and 18 provided in the housing and has its axis of rotation disposed at right angles to the axis of rotation of the worm wheel B.

The worm wheel B is arranged in the housing, below the worm C, and has hollow hub portions 19 and 20 at opposite ends thereof journaled in bearings 21 and 22 formed on said housing, as shown in Figure 3.

The chain winding drum A is in the form of a tubular member on which the brake chain 23 which leads to the brake mechanism proper of the car is windable, the chain being anchored to the drum A by a bolt 24, as shown in Figures 3 and 4.

The drum A is rotatably supported at its left hand end, as seen in Figure 3, in the hollow hub portion 19 of the worm wheel B. At its right hand end, as seen in Figure 3, the drum has a cylindrical bearing projection 25 of reduced diameter, journaled in a bearing member 26 provided on the housing section 11. Inwardly of the bearing projection 25, the drum A is provided with an annular series of ratchet teeth 27 forming a ratchet wheel member which is integral with the drum.

Slidably mounted within the drum A for to and fro movement axially of said drum is the clutch member E, having an annular series of clutch teeth 28—28 thereon engageable with interior clutch teeth 29 on the drum. As shown in Figure 3, the clutch member E has a stem 41 of reduced diameter, at its right hand end, slidable in the bearing projection 25 of the drum A and projecting outwardly through an opening 30 provided in the outer wall 31 of the bearing member 26. At the left hand end, the clutch member E is slidingly supported in the hub portion 20 of the worm wheel B and has a splined connection with said hub portion to rotate in unison with said worm wheel, the hub portion 20 being preferably provided with projecting ribs 32—32 engaged in lengthwise extending slots 33—33 in the member E.

The clutch member E is yieldingly pressed into clutching engagement with the drum A by a coil spring 34 surrounding the member E and bearing at its opposite ends on the shoulder formed by the clutch teeth 28—28, and an interior shoulder on the hub 20 of the worm wheel B.

The pawl H is mounted for vertical sliding movement above the chain winding drum A in a guide member 35 on the housing section 11 and is yieldingly pressed into engagement with the ratchet teeth 27—27 of the drum A by a spring 36 interposed between the upper end of the pawl and an interior bracket 37 on the housing section 11.

The shifting lever F is pivotally supported for swinging movement in a vertical plane within the housing section 11 by means of a pivot pin 38 extending through the lower end of said lever and a supporting web 39 on the housing section 11. The lever F has a depending finger 40 which is aligned with the clutch member E and is engageable with the stem 41 of said clutch member to effect shifting of the same. Above the pivot thereof, the lever F presents a relatively long arm 42, provided with a horizontally disposed finger member 43, extending into a slot 44, provided in the pawl H. As will be evident, upon swinging movement of the lever F in right hand direction, as seen in Figures 3 and 5, the finger 43 thereof will engage the upper end wall of the slot 44 of the pawl H and effect raising of the pawl out of engagement with the ratchet teeth 27—27 of the drum A. At the upper extremity thereof, the lever F is provided with a laterally projecting, cylindrical bearing element or trunnion 45.

The hand lever G serves to actuate the shifting lever F and is pivotally supported at its lower end by a pin 46 extending through the same and supported in the bracket 37. The lever G has a forked portion 47 below the pivot thereof engaged over the cylindrical bearing element or trunnion 45 of the shifting lever F. The upper end portion of the lever G, above the pivot thereof, presents an elongated, upstanding arm 48 extending through a slot 49 in the housing section 11. The arm 48 is located immediately in back of the hand wheel of the brake mechanism, where it may be readily manipulated by the brakeman to actuate the same and the lever F.

The operation of my improved hand brake mechanism is as follows: In applying the brakes, the chain winding drum is rotated in chain winding direction by the hand wheel actuated worm and worm gear, the clutch member E being engaged with the teeth of the chain winding drum A, as shown in Figure 3. The ratchet of the drum, comprising the teeth 27—27, is thus rotated in contraclockwise direction, as viewed in Figure 2, the pawl H ratcheting over the ratchet teeth and locking the drum against rotation in chain unwinding direction. When the brakes have been fully tightened, the pawl H holds the drum against rotation in chain unwinding direction. To release the brakes, the hand lever G is swung toward the left, as viewed in Figure 3, thereby actuating the shifting lever F, swinging the finger 40 thereof toward the left, as seen in Figure 3, through the position shown in Figure 4 to that shown in Figure 5. As the finger 40 of the shifting lever F moves from the position shown in Figure 3 to that shown in Figure 4, it forces the clutch member E to its disengaged position with respect to the drum A. At this time the pawl H is still engaged with the teeth 27—27 of the drum, as shown in Figure 4, and locks the drum against rotation in chain unwinding direction. As will be evident, there is little resistance to disengagement of the clutch as long as the pawl H is engaged with the teeth of the drum, inasmuch as the pawl takes the load in chain unwinding direction of the drum.

As the shifting lever F swings from the position shown in Figure 4 to that shown in Figure 5, the finger 43 lifts the pawl H clear of the ratchet teeth 27—27 of the drum, thereby permitting the latter to rotate freely in chain unwinding direction to release the brakes.

To shift the clutch member E to its engaged position, the hand lever G is swung toward the right from the position shown in Figure 5, through the position shown in Figure 4 to the position shown in Figure 3, thereby permitting the spring 34 to project the clutch member to the right, as seen in Figure 3, into engagement with the teeth 29 of the chain winding drum, and permitting the spring 36 to project the pawl H into engagement with the ratchet teeth 27—27 of the drum.

I claim:

1. In a hand brake mechanism, the combination with a chain winding drum; of a rotary driving member; a sliding spring pressed clutch member rotatable in unison with said driving member; interengaging clutch teeth on said clutch member and drum; an annular series of ratchet teeth on said drum; a spring pressed locking pawl engageable with said ratchet teeth for holding the drum against rotation in chain unwinding direction; a shifting lever for shifting the clutch member to disengaged position; and a finger on said lever engageable with said pawl for moving the latter out of engagement with the ratchet teeth.

2. In a hand brake mechanism, the combination with a chain winding drum; of a rotary driving member; a sliding spring pressed clutch member rotatable in unison with said driving member; interengaging clutch teeth on said clutch member and drum; an annular series of ratchet teeth on said drum; a spring pressed locking pawl engageable with said ratchet teeth for holding the drum against rotation in chain unwinding direction; lever means for shifting said clutch member to disengaged position; and means actuated by said lever means for moving said pawl to disengaged position.

3. In a hand brake mechanism, the combination with a chain winding drum; of a rotary driving member; a sliding spring pressed clutch member rotatable in unison with said driving member; interengaging clutch teeth on said clutch member and drum; an annular series of ratchet teeth on said drum; a spring pressed locking pawl engageable with said ratchet teeth for holding the drum against rotation in chain unwinding direction; lever means for shifting said clutch member to disengaged position; and means actuated by said lever means engageable with said pawl after the clutch member has been disengaged to disengage the pawl from the ratchet teeth of the drum.

4. In a hand brake mechanism, the combination with a chain winding drum; of a rotary driving member; a sliding spring pressed clutch member rotatable in unison with said driving member; interengaging clutch teeth on said clutch member and drum; an annular series of ratchet teeth on said drum; a spring pressed locking pawl engageable with said ratchet teeth for holding the drum against rotation in chain unwinding direction; a pivoted shifting lever having a short arm and a long arm, said short arm being engageable with one end of the clutch member to shift the same to disengaged position; and a finger on the long arm engageable with said pawl for retracting the same.

5. In a hand brake mechanism, the combination with a chain winding drum; of a rotary driving member; a sliding spring pressed clutch member rotatable in unison with said driving member; interengaging clutch teeth on said clutch member and drum; an annular series of ratchet teeth on said drum; a spring pressed locking pawl engageable with said ratchet teeth for holding the drum against rotation in chain unwinding direction; a pivoted shifting lever having a short arm and a long arm, said short arm being engageable with one end of the clutch member to shift the same to disengaged position; a trunnion on said long arm at the outer end thereof; a finger on said long arm inwardly of the outer end thereof engageable with said pawl to retract the same; and a hand operated lever pivoted at its lower end and having a fork portion engaged over said trunnion of the shifting lever.

6. In a hand brake mechanism, the combination with a chain winding drum; of a rotary hand wheel; a worm rotatable with said hand wheel; a worm gear meshing with said worm, said worm gear being aligned with said drum; a sliding spring pressed clutch member rotatable in unison with said worm gear; interengaging clutch teeth on said clutch member and drum; an annular series of ratchet teeth on said drum; a spring pressed locking pawl engageable with said ratchet teeth for holding the drum against rotation in chain unwinding direction; a shifting lever for shifting the clutch member to disengaged position; and a finger on said lever engageable with said pawl for moving the latter out of engagement with the ratchet teeth.

7. In a hand brake mechanism, the combination with a chain winding drum; of a rotary hand wheel; a worm rotatable with said hand wheel; a worm gear meshing with said worm, said worm gear being aligned with said drum; a sliding spring pressed clutch member rotatable in unison with said worm gear; interengaging clutch teeth on said clutch member and drum; an annular series of ratchet teeth on said drum; a spring pressed locking pawl engageable with said ratchet teeth for holding the drum against rotation in chain unwinding direction; lever means for shifting said clutch member to disengaged position; and means actuated by said lever means for moving said pawl to disengaged position.

GEORGE E. DATH.

REFERENCES CITED

The following references are of record in the file of this patent:

UNITED STATES PATENTS

| Number | Name | Date |
| --- | --- | --- |
| 95,057 | Waterhouse | Sept. 21, 1869 |
| 449,900 | Clemons | Apr. 7, 1891 |
| 1,869,580 | Olander | Aug. 2, 1932 |
| 1,928,027 | Olander | Sept. 26, 1933 |
| 2,121,095 | Olander | June 21, 1938 |
| 2,269,004 | Breen | Jan. 6, 1942 |
| 2,485,425 | Williams | Oct. 18, 1949 |